(12) United States Patent
Hanechak et al.

(10) Patent No.: US 7,797,167 B2
(45) Date of Patent: Sep. 14, 2010

(54) COOPERATIVE PRODUCT PROMOTION SYSTEM AND METHOD

(75) Inventors: Brian D. Hanechak, Waltham, MA (US); Michael J. Ewing, Acton, MA (US); James M. Connolly, Reading, MA (US)

(73) Assignee: Vistaprint Technologies Limited, Hamilton (BM)

( * ) Notice: Subject to any disclaimer, the term of this patent is extended or adjusted under 35 U.S.C. 154(b) by 1015 days.

(21) Appl. No.: 11/056,059

(22) Filed: Feb. 11, 2005

(65) Prior Publication Data

US 2006/0190274 A1  Aug. 24, 2006

(51) Int. Cl.
*G06Q 10/00* (2006.01)

(52) U.S. Cl. ...................................... 705/1.1
(58) Field of Classification Search ........... 705/1
See application file for complete search history.

(56) References Cited

U.S. PATENT DOCUMENTS 6,279,001 B1 * 8/2001 DeBettencourt et al. ...... 707/10
2002/0040333 A1 * 4/2002 Fuwa ........................ 705/27
2003/0023490 A1 * 1/2003 Lenyon et al. ................ 705/14

OTHER PUBLICATIONS

"VistaPrint.com Shatters 50,000 Paid Customer Mark". Business Wire. New York: Oct. 31, 2000. pg. 1.*

* cited by examiner

*Primary Examiner*—John G Weiss
*Assistant Examiner*—Gabrielle McCormick
(74) *Attorney, Agent, or Firm*—Jessica J. Costa

(57) ABSTRACT

Computer-implemented systems and methods for presenting personalized custom product designs to the customers of a second company. Email content promoting customizable products and containing images of product designs is prepared by the product vendor and supplied to a second company. The second company creates and sends an email containing the content to customers of the second company. If a recipient of the email selects one of the product images presented in the email, an identifier of the selected image and information about the email recipient are forwarded to the product vendor. The received recipient information is incorporated into the selected design to create a customized product design, which is displayed to the recipient for review.

12 Claims, 5 Drawing Sheets

COOPERATIVE PRODUCT PROMOTION SYSTEM AND METHOD

FIELD OF THE INVENTION

The present invention relates to cooperative electronic marketing of custom products.

BACKGROUND

Web-based providers of customized products, taking advantage of the capabilities of the World Wide Web and modern Web browsers, operate Web sites that provide online design services for user's desiring to create customized materials from any computer with Web access at whatever time and place is convenient to the user. These service providers typically provide their customers with the ability to access the service provider's Web site, view product templates, and use software tools provided by the site to select a template, add text or other content, and perform various modifications to create a personalized custom product design. After the product has been designed by the user, Web-based service providers also typically allow the user to place an order for the production and delivery to the user's home or business of quantities of high quality, printed products of the type that the user is not capable of producing with the printer systems typically connected to most personal computer systems.

Web-based providers of customized products, like virtually all businesses, strive to attract new customers through various advertising and customer acquisition channels. Sending promotional emails to rented lists of email addresses from other companies is one common technique, but list renters rarely, if ever, obtain access to specific personal information about the individuals or companies associated with the email addresses. Promotional email communications are typically in the form of bulk, standardized emails describing one or more of the company's products or services and containing one or more links to the company's Web site. Response rates to bulk email campaigns are typically low and any parties coming to the site in response to the email must typically "start from scratch" in the product design process.

There is, therefore, a need for a novel collaborative system and method for acquiring new customers by using email solicitations that take advantage of available information about the email recipient to facilitate the design process by presenting a partially or completely finished product design created automatically by the product vendor.

SUMMARY

The present invention is directed at satisfying the need for systems and methods that provide a streamlined cooperative email marketing experience.

In accordance with one aspect of the invention, an email containing images of various customizable product designs offered by a first company is transmitted by a second company to the second company's customer base. The product designs displayed in the email each have an associated design identifier and each product design has an associated link allowing the email recipient to select the design and initial a design session to create a personalized product based on the selected design. Upon the recipient's selection of one of the designs in the email, the second company forwards the design identifier of the selected design to the first company along with relevant information about the associated email recipient.

In response to the received design identifier, the first company integrates the supplied customer information into the selected design image to create a personalized product image pre-filled with relevant customer information. An edit page from the first company's site is displayed in a browser window opened at the recipient's computer. The edit page displays the selected design image, with the received customer information pre-entered in the appropriate fields, and provides editing tools with which the customer may, if desired, delete or change the pre-entered information or add additional information. If some information for which fields are provided in the product design is not received from the second company, those fields are populated with generic placeholder text indicating where the customer's information will be placed.

DESCRIPTION

Figure 1:
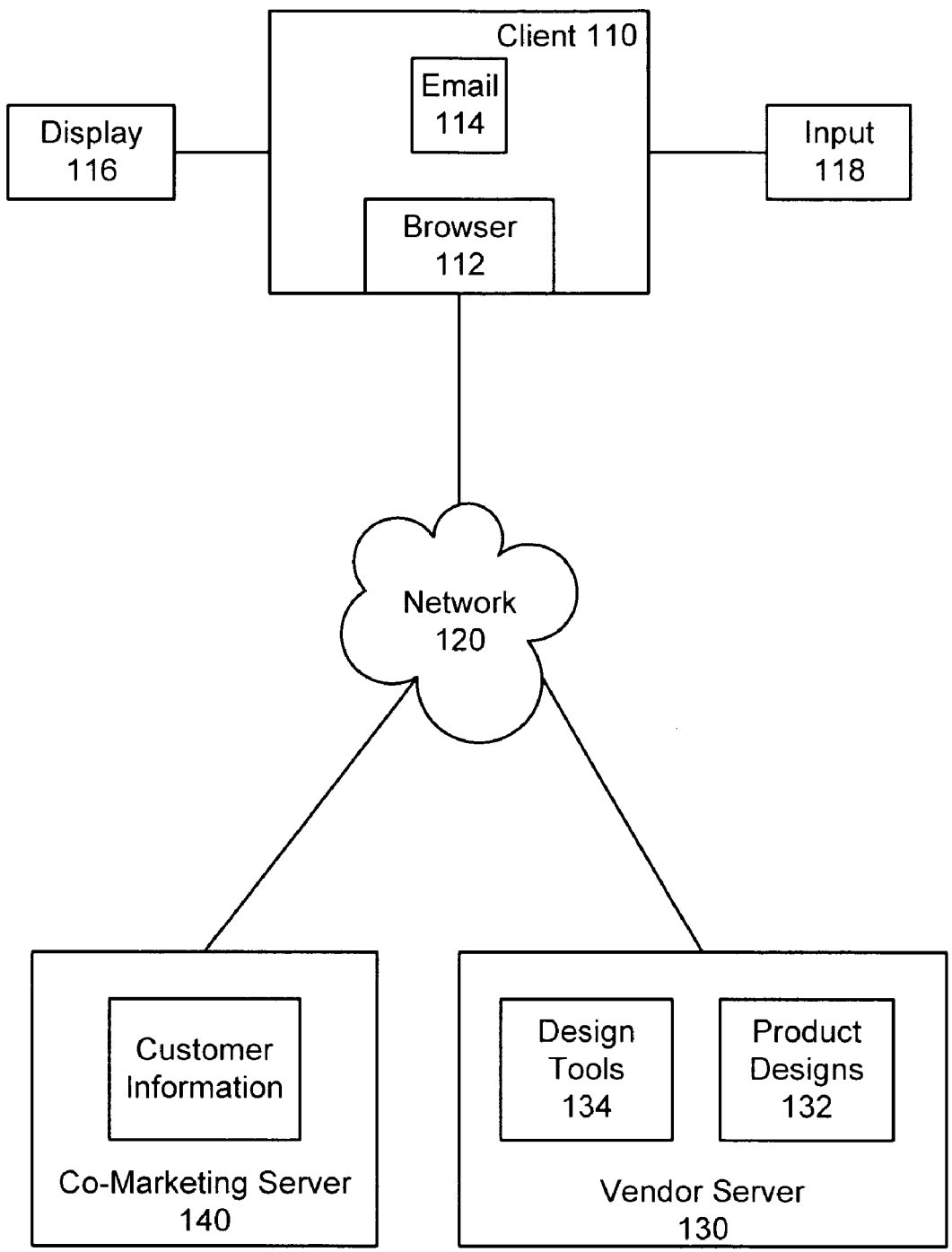
FIG. 1 is a schematic representation of a system with which the invention can be employed.

Referring to FIG. 1, client 110 is a typically equipped personal computer, portable computer, or other system capable of communicating via network 120, such as the Web, with remote server systems, such as vendor server 130 and co-marketing server 140, and capable of executing system and application programs, such as web browser program 112 and email program 114. The client 110 system includes user display 116 capable of displaying text, images, and graphics to a user of the system and one or more user data input devices 118, such as a keyboard and a mouse.

Server 130 is the web site computing and support system of a vendor of customized products. In the following discussion, a custom printed product vendor site that allows users of the site to design and purchase personalized printed products using online software tools available at the site, such as the VistaPrint.com site operated by VistaPrint Limited, will be discussed, but it will be understood that the invention is not so limited. While server 130 and co-marketing server 140, discussed below, are depicted in FIG. 1 as single blocks, it will be understood that servers 130 and 140 may be comprised of multiple servers, data storage systems, and other equipment and devices configured to communicate and operate cooperatively to support the business and computing operations of the server operators.

Vendor server 130 retains a variety of templates, images, graphics, text, and other content for creating various electronic product designs, all collectively represented in FIG. 1 as product designs 132. Server 130 also has a plurality of software design tools 134 allowing the user of remote client computers, such as client 110, to enter and position user text and perform other edit operations on a product template supplied by the product vendor to create a custom personalized product design.

Co-marketing server 140 represents a Web server system operated by another company that has entered into an agreement with the product vendor to cooperate in the marketing of vendor products and services to the customers identified in customer information 142. In the embodiment shown in FIG. 1, a database of customer information 142 that has been developed, acquired, or licensed by the co-marketer is stored on server 140. Customer information 142 could, alternatively, be retained on another local or remote system that is accessible to server 140 when required. Customer information 142 contains customer email addresses and at least some additional customer contact information, such as name, address, telephone number, and the like.

The custom product vendor desires to promote its products and services to the customers in customer information 142 with the aim of attracting new customers. To this end, for the purposes of the discussion herein, the product vendor has entered into an agreement with the party controlling customer information 142 whereby the vendor and the operator of server 140 will mutually cooperate to prepare and transmit an email to the customers identified in customer information 142. In addition, as will be discussed below, when an email recipient indicates a desire to prepare a custom image, the two parties will mutually cooperate to transfer appropriate customer information from server 140 to server 130.

Figure 2:
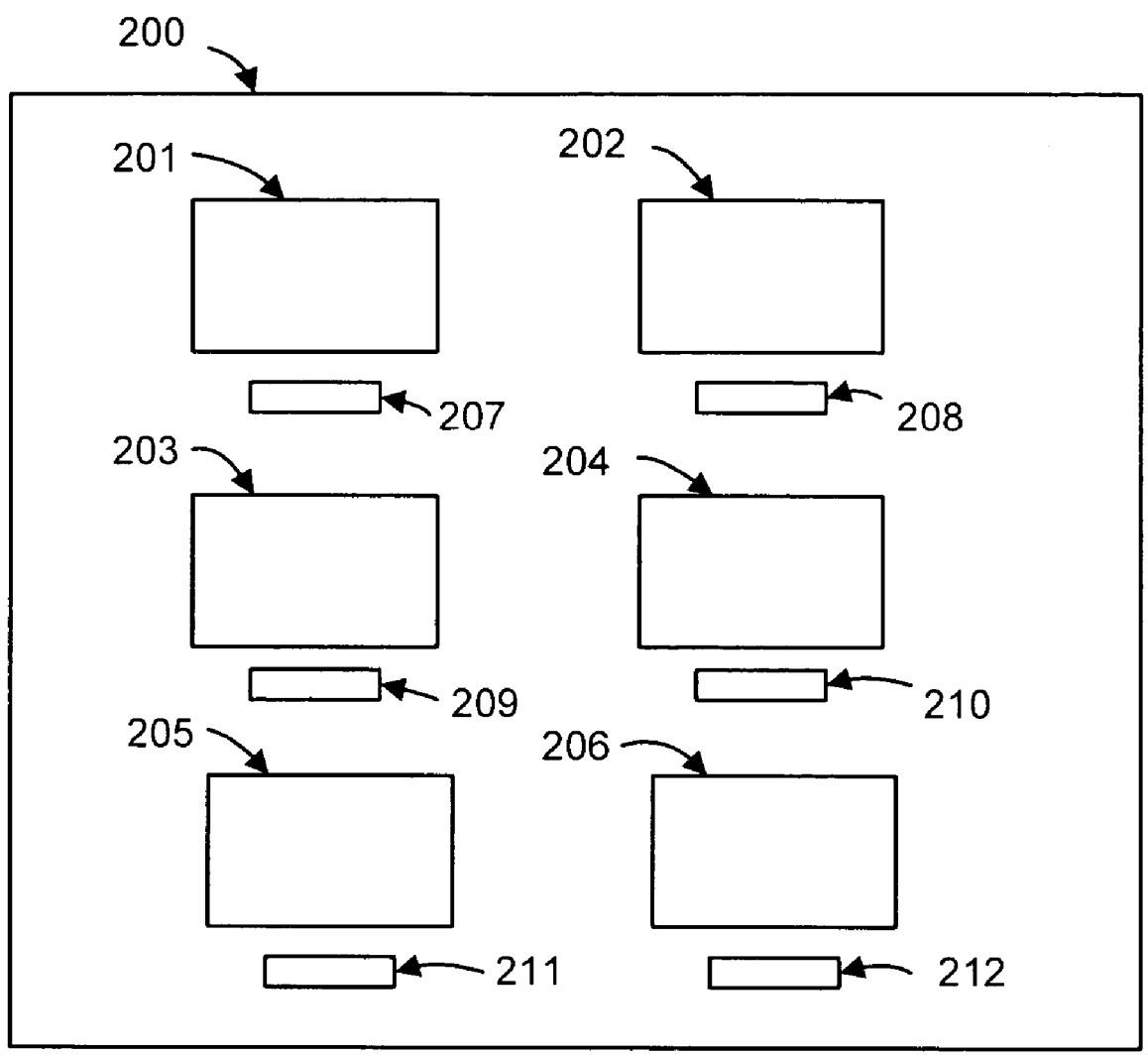
FIG. 2 is simplified depiction of an embodiment of a promotional email message.

Referring to FIG. 2, a simplified representation of a promotional email 200 prepared in accordance with the invention is shown. Because, as discussed below, server 140 must perform actions to facilitate the response of server 130 to email recipients, both the operator of server 130 and the operator of server 140 will typically be involved in preparing a promotional email. In general, the product vendor will prepare and arrange the product design images and other creative content to be displayed to the email recipient. The operator of server 140 will package and transmit the vendor-supplied material and information with the appropriate additional information necessary to allow server 140 to identify each email recipient who responds to the email and retrieve information associated with each responding recipient from customer information 142. Prior to transmission of promotional emails to the customers identified in customer information 142, the product vendor and the operator of server 140 will mutually agree on a data exchange format to be used for communications between the parties.

In the example shown in FIG. 2, email 200 contains six product design images 201-206. The exact number of design images is not significant and a greater or lesser number of images could be used in the email, if desired. An email showing only a single design image could be employed, but a greater number of design images showing a variety of designs increases the likelihood that the email recipient will be presented with a design that the recipient finds appealing or attractive. The images can be sized and positioned within the email as desired by the product vendor.

For simplicity, images 201-206 are shown in FIG. 2 as empty rectangles, but it will be understood that images 201-206 in an actual promotion email would be product design images developed by the vendor to contain a range and variety of design elements, such as images, graphics, color schemes and fonts, to give the email recipient an indication of the variety of designs that are possible. Typically, all images 201-206 in an email will be for a single type of product, such as a business card, postcard, invitation, announcement, or other type of product available from the vendor. A typical email 200 would also include additional content, not shown, such as additional images, graphics, links, and informational and promotional text.

To allow interested recipients to initiate the design process for a custom product, the email will typically be created such that each design image is an active link that can be selected by the email recipient to activate and initiate the personalization process of that design with server 130. In the embodiment shown in FIG. 2, the email is implemented such that each image 201-206 has an associated button 207-212 bearing a legend such as "Use This Design" or the like, each button 207-212 also being implemented as an active link to initiate the personalization process using the associated product image.

Each design image used in the promotional email is assigned a unique design identifier that is incorporated into the email and, as discussed below, is used by server 130 to identify the particular design selected by a recipient and to prepare a customized image. If, after opening and reviewing the email, a recipient selects one of the images 201-206 or buttons 207-212, information identifying the specific selected image and information identifying the email recipient is returned to server 140. Upon receiving the information from client 110, server 140 will retrieve the appropriate information for that recipient from customer information 142 and forward it to server 130 in a mutually agreed format along with the design identifier.

Figure 3:
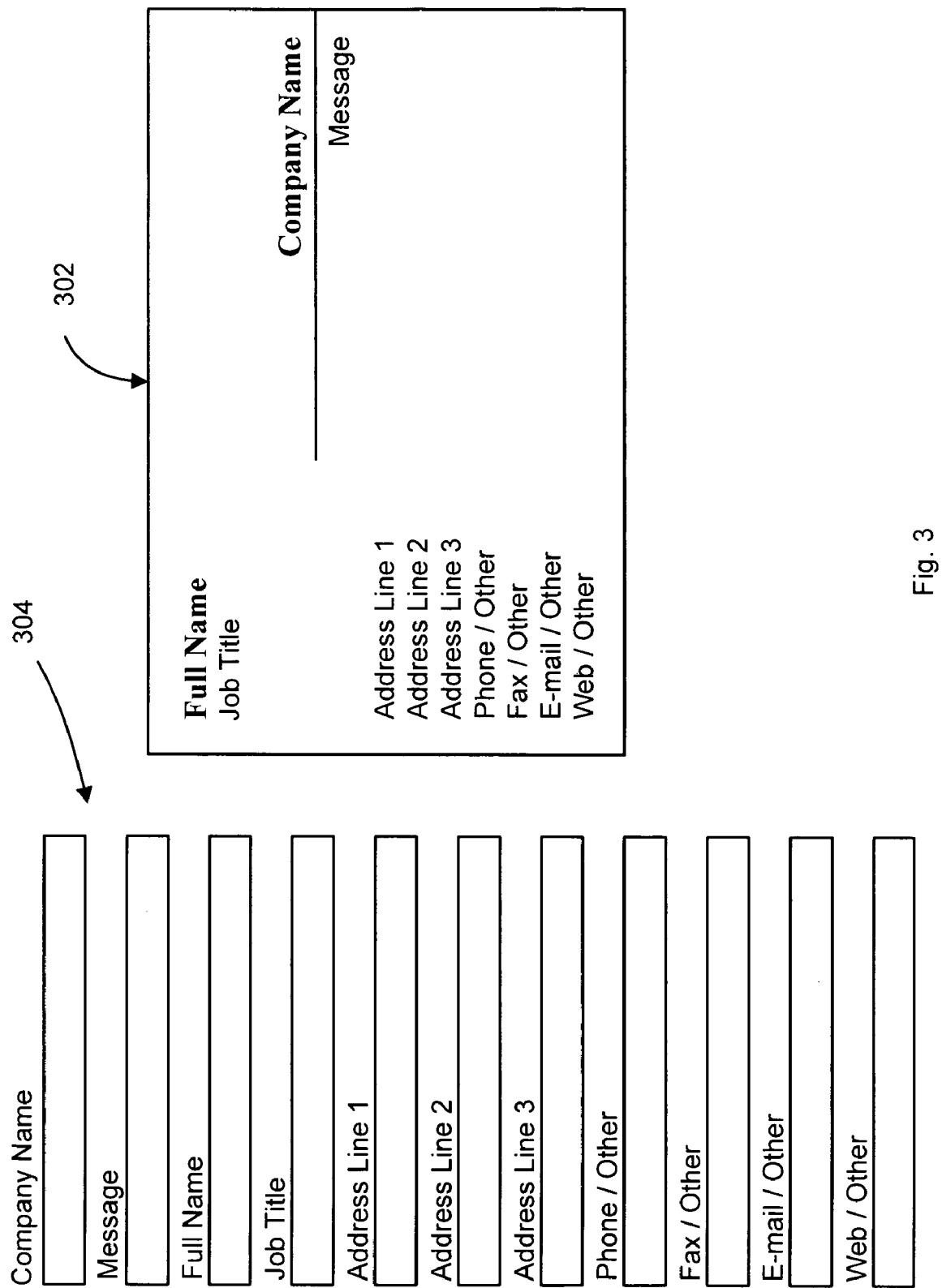
FIG. 3 is a representative embodiment of a product design edit page before customization.

Referring to FIG. 3, an embodiment of a representative edit display 300 for allowing a customer to personalize business card design 302 is depicted. No specific customer contact information is shown in FIG. 3. Business card design 302 includes eleven pre-defined data fields 304, including fields for entering company name, message, full name, and so forth. The various positions of where text entered for these fields will appear in the body of the card are indicated in image 302.

Figure 4:
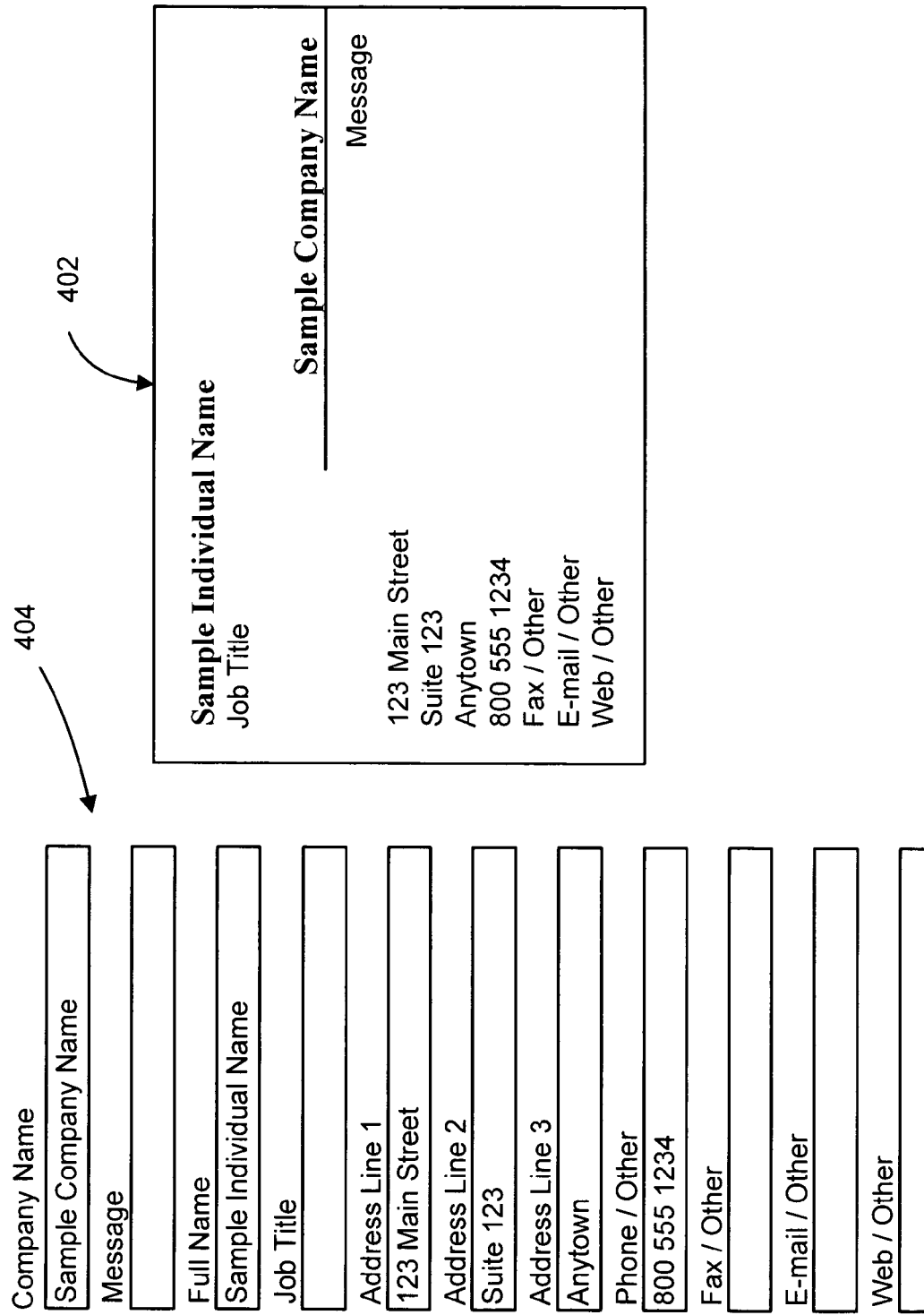
FIG. 4 is a representation of the product design page of FIG. 3 after customization with received customer information

The intent of the product provider is that email recipients will not see a completely uncustomized edit display, such as shown in FIG. 3, but rather will see a partially, or fully, customized edit screen such as shown in FIG. 4. Ideally, the vendor would like to receive the complete set of customer information needed to fully populate the product design, but in some cases the information will not all be present in customer information 142. For the purpose of illustration, FIG. 4 shows an example situation where only the information for Company Name, Full Name, Address Lines 1-3, and Phone/Other was retrieved from customer information 142 and forwarded to server 130. Server 130 automatically incorporated this information into the design selected by the customer in the email and displayed the partially completed business card design as design image 402. The customer information is also automatically entered and displayed in the corresponding fields 404. In the example shown, information for some pre-defined data fields, such as Message and Job Title, was not successfully received from customer information 142, therefore the corresponding fields 404 remain empty with corresponding generic placeholder text for those fields displayed in image 402 to prompt the customer to make entries for those fields. When the design is completed to the customer's satisfaction, the customer can continue through the product vendor's usual order placement process.

Figure 5:
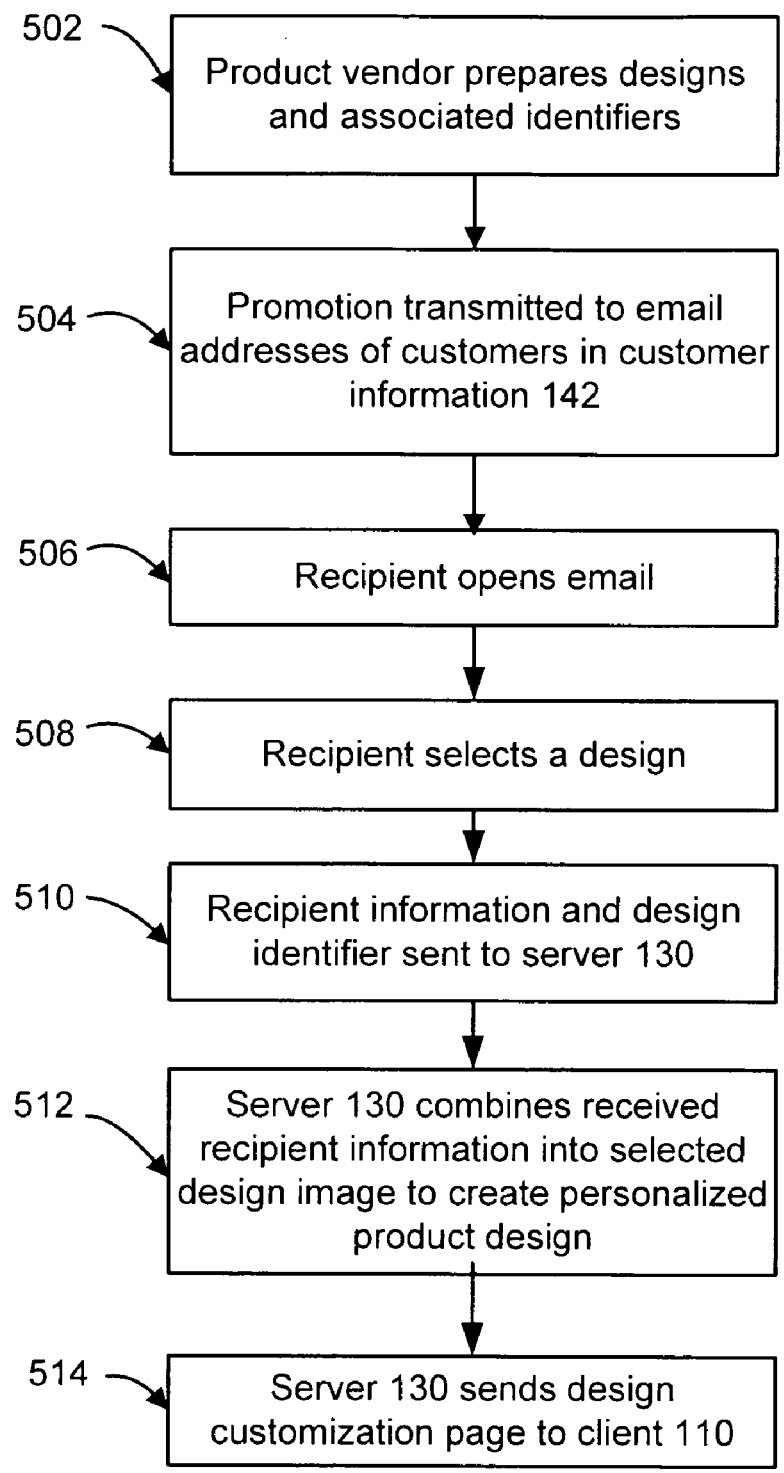
FIG. 5 is a flow chart showing a representative method for cooperative electronic product promotion.

Referring to FIG. 5, a representative embodiment of a method for soliciting customers in accordance with the invention will be discussed. As mentioned above, because promotions as described herein require coordination between the product vendor and the owner or custodian of the customer information, the parties will typically have reached agreement on technical and contractual and technical issues, such as a mutually agreed format and procedure for exchanging information, prior to the initiation of email promotions. At step 502, the product vendor creates and forwards the design images and image identifiers and other creative components of the email promotion to the customer information owner or custodian. If the parties plan a joint promotional campaign, both parties may collaborate on or contribute to the appearance and content of the email.

At step 504, the operator of server 140 completes the email with the information required by server 140, such as information needed to identify the specific recipient, and transmits it to the email addresses associated with the customers in customer information 142. It is likely that some email addresses with be out-of-date or inoperative and that not all emails that are delivered will actually be opened, but at least some of the transmitted emails will be received and opened at step 506. Of the emails that are opened by recipients, not all recipients will be interested, therefore some emails will be closed or deleted without further recipient action, but at least some portion of the recipients will select one of the links in the email at step 508, causing the product design process to be initiated.

At step 510, the recipient information from customer information 142 and the design identifier are provided to server 130. This information transfer could be accomplished in various ways. For example, the relevant customer information could have been incorporated into the email to the recipient from server 140 along with a link causing browser 112 to pass the customer information and the design image identifier directly to server 130 when the recipient selects one of the design images. Alternatively, the email could be designed to respond to the selection of one of the design images by making a request back to server 140. Server 140 would respond to the request by sending the associated customer information for the recipient to client 110 along with a request for client 110 to redirect to server 130 and provide the customer information and the design image identifier. At step 512, server 130 incorporates the received customer information into the appropriate fields and positions in the selected product design template, as illustrated in FIG. 4. At step 514, server 130 displays edit page 400 with the personalized product design 402 in a browser window at client 110.

If all necessary information to complete a design was received from server 140 and is satisfactory to the customer, the customer may choose to immediately begin the vendor's usual purchase process. If some fields are incomplete because the information was not available from server 140 or if one or more fields are incorrect or otherwise required updating or correction, the customer can enter missing information or edit the current information using data fields 404 or any other editing tools that the vendor may choose to make available to the customer.

While an exemplary embodiment of the invention has been discussed, the described embodiment is to be considered as illustrative rather than restrictive. The scope of the invention is as indicated in the following claims and all equivalent methods and systems.

What is claimed is:

1. A computer-implemented cooperative method for preparing a customized product, the method comprising:

retaining, at a computer system of a first business, one or more unpersonalized product design images having one or more customer information fields corresponding to respective types of customer information, each unpersonalized product design image having an image identifier associated therewith and comprising an image of the product prior to personalization of the product specific to a customer, transferring the one or more unpersonalized product design images and image identifiers to a computer system of a second business, the second business preparing an email containing the one or more unpersonalized product design images and transmitting the email to a plurality of email addresses available to the second business, the email addresses being associated with customer information available to the second business, the customer information comprising one or more types of customer information, when an email recipient opens the email at a remote client and selects one of the one or more impersonalized product design images, automatically transferring the image identifier of the selected unpersonalized product design image and at least some of the customer information associated with the email address of the email recipient including at least one of the one or more types of customer information to the first business, upon receipt of the transferred image identifier and the transferred customer information at the first business, automatically incorporating the received at least one of the one or more types of customer information into corresponding customer information fields in the selected unpersonalized product design to create a personalized product design, and upon creation of the personalized product design at the first business, displaying the personalized product design to the email recipient in a browser at the remote client.

2. The method of claim 1 further comprising making one or more editing tools available to the email recipient such that the email recipient can modify the displayed personalized product design.

3. The method of claim 1 further comprising making one or more tools available to the email recipient such that the email recipient can place an order for the displayed personalized product design.

4. A computer-implemented cooperative method for preparing a customized product, the method comprising:

preparing one or more representative product design images at a computer system of a first business, each image having an image identifier associated therewith, retaining, at a computer system of a first business, one or more unpersonalized product design images having one or more customer information fields corresponding to respective types of customer information, each unpersonalized product design image having an image identifier associated therewith and comprising an image of the product prior to personalization of the product specific to a customer, transferring the one or more unpersonalized product design images and image identifiers to a computer system of a second business, the second business preparing an email containing the one or more unpersonalized product design images and transmitting the email to a plurality of email addresses available to the second business, the email addresses being associated with customer information available to the second business, the customer information comprising one or more types of customer information, when an email recipient receives the email displayed in a browser running on a client computer system and selects one of the one or more unpersonalized product design images, automatically redirecting the browser of the client computer system to the computer system of the first business and transferring the image identifier of the selected unpersonalized product design image and at least some of the customer information associated with the email address of the email recipient including at least one of the one or more types of customer information to the computer system of the first business, upon receipt of the transferred image identifier and the transferred customer information at the first business, automatically incorporating the received at least one of the one or more types of customer information into corresponding customer information fields in the selected unpersonalized product design to create a personalized product design;

upon creation of the personalized product design at the first business, displaying the personalized product design in the browser of the client computer system; and making one or more editing tools available to the email recipient such that the email recipient can modify the displayed personalized product design.

5. The method of claim 4, wherein:

the step of transmitting the email to a plurality of email addresses available to the second business comprises incorporating the customer information including at least one of the one or more types of customer information into the email along with a link directing the browser of the client computer system to a web page at the computer system of the first business and causing the browser of the client computer to pass the incorporated customer information and the identifier of the selected unpersonalized product design image to the computer system of the first business when the recipient selects the unpersonalized product design image associated with the identifier; and the step of redirecting the browser of the client computer system to the computer system of the first business comprises directing the browser of the client computer to the web page indicated in the link and receiving from the browser of the client computer the incorporated customer information including at least one of the one or more types of customer information and the identifier of the selected unpersonalized product design image.

6. The method of claim 5, wherein the web page is an edit page which displays and allows editing of the personalized product design.

7. The method of claim 4, wherein:

the step of redirecting the browser of the client computer system to the computer system of the first business comprises generating a request in the browser of the client computer system back to the computer system of the second business, the computer system of the second business sending to the client computer system the customer information including at least one of the one or more types of customer information associated with the email address of the email recipient, and a request for the client computer system to redirect the browser of the client computer system to a web page at the computer system of the first business and provide the customer information including at least one of the one or more types of customer information and the design image identifier.

8. The method of claim 7, wherein the web page is an edit page which displays and allows editing of the personalized product design.

9. A system for preparing a cooperatively preparing a customized product, comprising:

one or more vendor servers of a vendor business having retaining means which retain one or more unpersonalized product design images having one or more customer information fields corresponding to respective types of customer information, each unpersonalized product design image having an image identifier associated therewith and comprising an image of the product prior to personalization of the product specific to a customer, the one or more vendor servers having transferring means which transfer the one or more unpersonalized product design images and image identifiers to a computer system of a co-marketing business, wherein the co-marketing business prepares an email containing the one or more unpersonalized product design images and transmits the email to a plurality of email addresses available to the co-marketing business, the email addresses being associated with customer information under the control of the co-marketing business, the customer information comprising one or more types of customer information, wherein the email is configured such that when an email recipient opens the email at a remote client and selects one of the one or more unpersonalized product design images, the image identifier of the selected unpersonalized product design image and at least some of the customer information associated with the email address of the email recipient including at least one of the one or more types of customer information are transferred to the vendor server, the one or more vendor servers further comprising one or more design tools configured to receive the transferred image identifier and the transferred customer information, and to automatically incorporate the received at least one of the one or more types of customer information into corresponding customer information fields in the selected unpersonalized product design to create a personalized product design, and the one or more vendor servers further configured to display the personalized product design to the email recipient in a browser at the remote client.

10. A system for cooperatively preparing a customized product, comprising:

one or more vendor servers of a vendor business having retaining means which retain one or more unpersonalized product design images having one or more customer information fields corresponding to respective types of customer information, each unpersonalized product design image having an image identifier associated therewith and comprising an image of the product prior to personalization of the product specific to a customer, one or more co-marketing servers of a co-marketing business configured to receive from a vendor one or more unpersonalized product design images each comprising an image of the product prior to personalization of the product specific to a customer and each having one or more customer information fields corresponding to respective types of customer information and an associated image identifier, the one or more comarketing servers further configured to prepare an email containing the one or more unpersonalized product design images and transmit the email to a plurality of email addresses available to the co-marketing business, the email addresses being associated with customer information available to the co-marketing business, the customer information comprising one or more types of customer information, the one or more comarketing servers preparing the email such that when an email recipient opens the email at a remote client and selects one of the one or more unpersonalized product design images, the image identifier of the selected unpersonalized product design image and at least some of the customer information associated with the email address of the email recipient including at least one of the one or more types of customer information are automatically transferred to one or more vendor servers of the vendor business to allow the one or more vendor servers to select the unpersonalized product design associated with the selected image identifier and to incorporate the received at least one of the one or more types of customer information into corresponding customer information fields in the selected unpersonalized product design to create a personalized product design for display to the email recipient in a browser at the remote client.

11. Non-transitory computer readable storage tangibly embodying program instructions which, when executed by a computer, implement a method for preparing a customized product, the method comprising:

retaining, at a computer system of a first business, one or more unpersonalized product design images having one or more customer information fields corresponding to respective types of customer information, each unpersonalized product design image having an image identifier associated therewith and comprising an image of the product prior to personalization of the product specific to a customer, transferring the one or more unpersonalized product design images and image identifiers to a computer system of a second business, the second business preparing an email containing the one or more unpersonalized product design images and transmitting the email to a plurality of email addresses available to the second business, the email addresses being associated with customer information available to the second business, the customer information comprising one or more types of customer information, when an email recipient opens the email at a remote client and selects one of the one or more unpersonalized product design images, automatically transferring the image identifier of the selected unpersonalized product design image and at least some of the customer information associated with the email address of the email recipient including at least one of the one or more types of customer information to the first business, upon receipt of the transferred image identifier and the transferred customer information at the first business, automatically incorporating the received at least one of the one or more types of customer information into corresponding customer information fields in the selected unpersonalized product design to create a personalized product design, and upon creation of the personalized product design at the first business, displaying the personalized product design to the email recipient in a browser at the remote client.

12. Non-transitory computer readable storage tangibly embodying program instructions which, when executed by a computer, implement a method for preparing a customized product, the method comprising:

preparing one or more representative product design images at a computer system of a first business, each image having an image identifier associated therewith, retaining, at a computer system of a first business, one or more unpersonalized product design images having one or more customer information fields corresponding to respective types of customer information, each unpersonalized product design image having an image identifier associated therewith and comprising an image of the product prior to personalization of the product specific to a customer, transferring the one or more unpersonalized product design images and image identifiers to a computer system of a second business, the second business preparing an email containing the one or more unpersonalized product design images and transmitting the email to a plurality of email addresses available to the second business, the email addresses being associated with customer information available to the second business, the customer information comprising one or more types of customer information, when an email recipient receives the email displayed in a browser running on a client computer system and selects one of the one or more unpersonalized product design images, automatically redirecting the browser of the client computer system to the computer system of the first business and transferring the image identifier of the selected unpersonalized product design image and at least some of the customer information associated with the email address of the email recipient including at least one of the one or more types of customer information to the computer system of the first business, upon receipt of the transferred image identifier and the transferred customer information at the first business, automatically incorporating the received at least one of the one or more types of customer information into corresponding customer information fields in the selected unpersonalized product design to create a personalized product design;

upon creation of the personalized product design at the first business, displaying the personalized product design in the browser of the client computer system; and making one or more editing tools available to the email recipient such that the email recipient can modify the displayed personalized product design.

* * * * *